United States Patent
Dudziak et al.

(10) Patent No.: US 9,154,482 B2
(45) Date of Patent: Oct. 6, 2015

(54) SECURE ACCESS CREDENTIAL UPDATING

(71) Applicant: Verizon Patent and Licensing Inc., Basking Ridge, NJ (US)

(72) Inventors: Thaddeus J. Dudziak, Pleasanton, CA (US); Robert A. Sartini, Colorado Springs, CO (US); Paul T. Schultz, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

(21) Appl. No.: 13/768,306

(22) Filed: Feb. 15, 2013

(65) Prior Publication Data

US 2014/0237564 A1  Aug. 21, 2014

(51) Int. Cl.
*H04L 29/06* (2006.01)

(52) U.S. Cl.
CPC ............... *H04L 63/08* (2013.01); *H04L 63/101* (2013.01); *H04L 63/107* (2013.01)

(58) Field of Classification Search
CPC ..................................................... H04L 29/06
See application file for complete search history.

(56) References Cited

U.S. PATENT DOCUMENTS

| | | | | |
|---|---|---|---|---|
| 6,647,494 | B1* | 11/2003 | Drews | 713/170 |
| 6,668,322 | B1* | 12/2003 | Wood et al. | 713/182 |
| 7,240,214 | B2* | 7/2007 | Gazzetta et al. | 713/182 |
| 7,366,303 | B2* | 4/2008 | Flykt et al. | 380/247 |
| 7,890,084 | B1* | 2/2011 | Dudziak et al. | 455/411 |
| 7,984,488 | B2* | 7/2011 | Cross et al. | 726/6 |
| 8,032,165 | B2 | 10/2011 | Dudziak et al. | |
| 8,099,765 | B2* | 1/2012 | Parkinson | 726/5 |
| 8,474,017 | B2* | 6/2013 | Schultz et al. | 726/4 |
| 8,532,621 | B2* | 9/2013 | Plestid et al. | 455/411 |
| 8,539,558 | B2* | 9/2013 | Radhakrishnan et al. | 726/4 |
| 8,539,559 | B2* | 9/2013 | Nakhjiri | 726/6 |
| 8,683,560 | B1* | 3/2014 | Brooker et al. | 726/6 |
| 2008/0046982 | A1* | 2/2008 | Parkinson | 726/5 |
| 2008/0046984 | A1* | 2/2008 | Bohmer et al. | 726/5 |
| 2011/0041167 | A1* | 2/2011 | Nguyen | 726/6 |
| 2011/0314533 | A1* | 12/2011 | Austin et al. | 726/9 |

OTHER PUBLICATIONS

D. Hardt, Ed., "The OAuth 2.0 Authorization Network", RFC 6749, Internet Engineering Task Force (IETF), Microsoft, Oct. 2012, 152 pages.

* cited by examiner

*Primary Examiner* — Jeffrey Pwu
*Assistant Examiner* — Wasika Nipa

(57) ABSTRACT

One or more first servers may receive a token, generated by a second server based on the second server validating an authorization parameter received by a third server; receive, from the second server, a token parameter, associated with the token and being associated with the authorization parameter and identifying a credential associated with the third server; receive, from the third server, a request to update the credential, the request including the token; validate the token; form an updated credential based on the token parameter and based on validating the token; and provide the updated credential to the third server. The credential may be replaced, by the third server, with the updated credential without interaction with a user of the third server.

20 Claims, 6 Drawing Sheets

| Authorization Parameters 410 ||| Token Parameters 420 |||
|---|---|---|---|---|---|
| Administrative credentials 411 | IP Address 412 | Location 413 | Credential update authorization 421 | Update time period 422 | Regression time period 423 |
| username1/ password1 | 123.123.001 | 37.775,-122.421 <1 mi | password, finger print, entity name, company address | | |
| username1/ password1 | 123.123.002 | Location 1 | password, voice print | 5 min | 2 weeks |
| username2/ password2 | 123.123.003 | Location 2 | password, retina, voice print | 10 min | 3 weeks |
| username2.1/pa ssword2.1 | 123.123.004 | Any | password, finger print | 8 min | 1 week |
| | | | | 15 min | 2 weeks |

Fig. 4

SECURE ACCESS CREDENTIAL UPDATING

BACKGROUND

An application server sometimes communicates with a network provider server, based on a set of credentials embedded in an application of the application server, to provide a service (e.g., a location identification service for a user device) via the application. The network provider server sometimes requires the application server to change the set of credentials for security purposes.

BRIEF DESCRIPTION OF THE DRAWINGS

FIG. 4 illustrates an example data structure that may be stored by one or more devices in the environment of FIG. 2;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may update credentials (e.g., without user interaction) embedded within an application that is authorized to access a network provider server in order to provide a service to a user device (e.g., a service to send/receive messages between user devices, a service to locate a user device, etc.). In some implementations, the systems and/or methods may update the credentials without interaction between a user and the network provider server, thereby allowing the credentials to be changed at any time.

Figure 1:
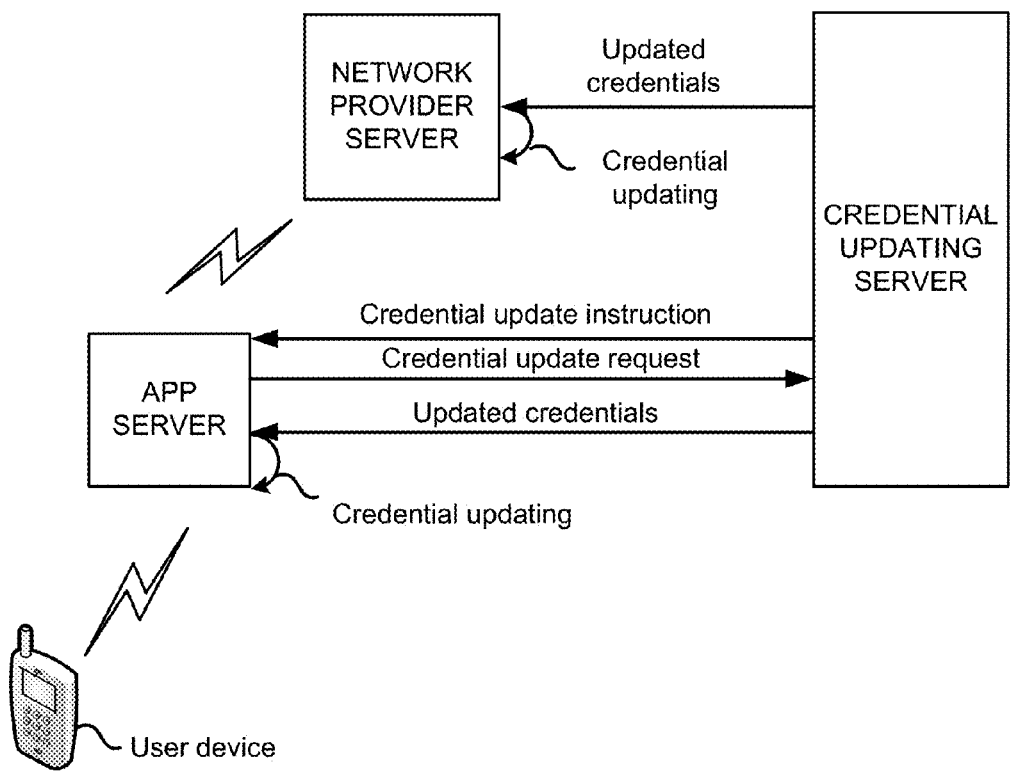
FIG. 1 illustrates an example overview of an implementation described herein.

FIG. 1 illustrates an example implementation as described herein. In FIG. 1, assume that an application server (referred to as an "app server") implements an application used to provide a service to a user device. Further, assume that the app server is authorized to communicate with a network provider server to invoke service functionality (e.g., a click to call service, a location service, etc.) and/or to access data stored by the network provider server in order to provide the service. For example, the app server can use the application and the credentials to communicate with the network provider server in order to receive data used to provide a service to a user device.

As an example, the app server may provide, to the network provider server, information regarding another user device (e.g., a telephone number, a device identifier, etc.), as part of a request to identify a location of the other user device. The app server may receive data (e.g., from the network provider server) identifying the location of the other user device, and may provide information identifying the location of the other user device to the user device in FIG. 1. Additionally, or alternatively, the app server may communicate with the network provider server (e.g., by using valid credentials) for some other purpose.

In some implementations, the credentials, used to access the network provider server, may be updated for security purposes. As described above, the credentials may be updated without user interaction between a user and the network provider server.

For example, as shown in FIG. 1, a credential updating server may provide, to the app server, an instruction to update the credentials (e.g., based on a security protocol directing the app server to change the credentials after a particular period of time, based on detecting suspicious activity of the app server, such as requests to access the network provider server from an unknown domain, or based on some other factor). In some implementations, the app server may provide, to the credential update server, a request to update the credentials (e.g., based on receiving the instruction to update the credentials, based on an instruction received by an operator of the app server to update the credentials, based on detecting suspicious activity of the app server, based on identifying an unexpected network provider service charge, based on identifying a greater than a threshold number of network provider service charges, and/or based on some other factor).

In some implementations, the request to update the credentials may include a set of administrative credentials of the app server, an internet protocol (IP) address of the app server, an identifier of the app server, information identifying a geographic location of the app server, information identifying a geographic location of an administrator device used to request to update the credentials, and/or some other information. In some implementations, the credential updating server may generate updated credentials for the application and may provide the updated credentials to the app server and to the network provider server.

In some implementations, the app server may update the credentials of the application based on the updated credentials received by the credential updating server. Further, the network provider server may update the credentials based on the updated credentials received by the credential updating server. Because the credentials may be updated without user interaction between a user and the network provider server, the credentials may be updated at any time and may prevent service interruption as a result of outdated credentials. Further, updating the credentials may not be susceptible to user error since the app server may update the credentials without user interaction. For example, the app server may use a copy and paste function to copy the updated credentials and paste the updated credentials in a storage of the application implemented by the app server. As a result, the updated credentials may include a string of characters of any length, format, and/or complexity.

Figure 2:
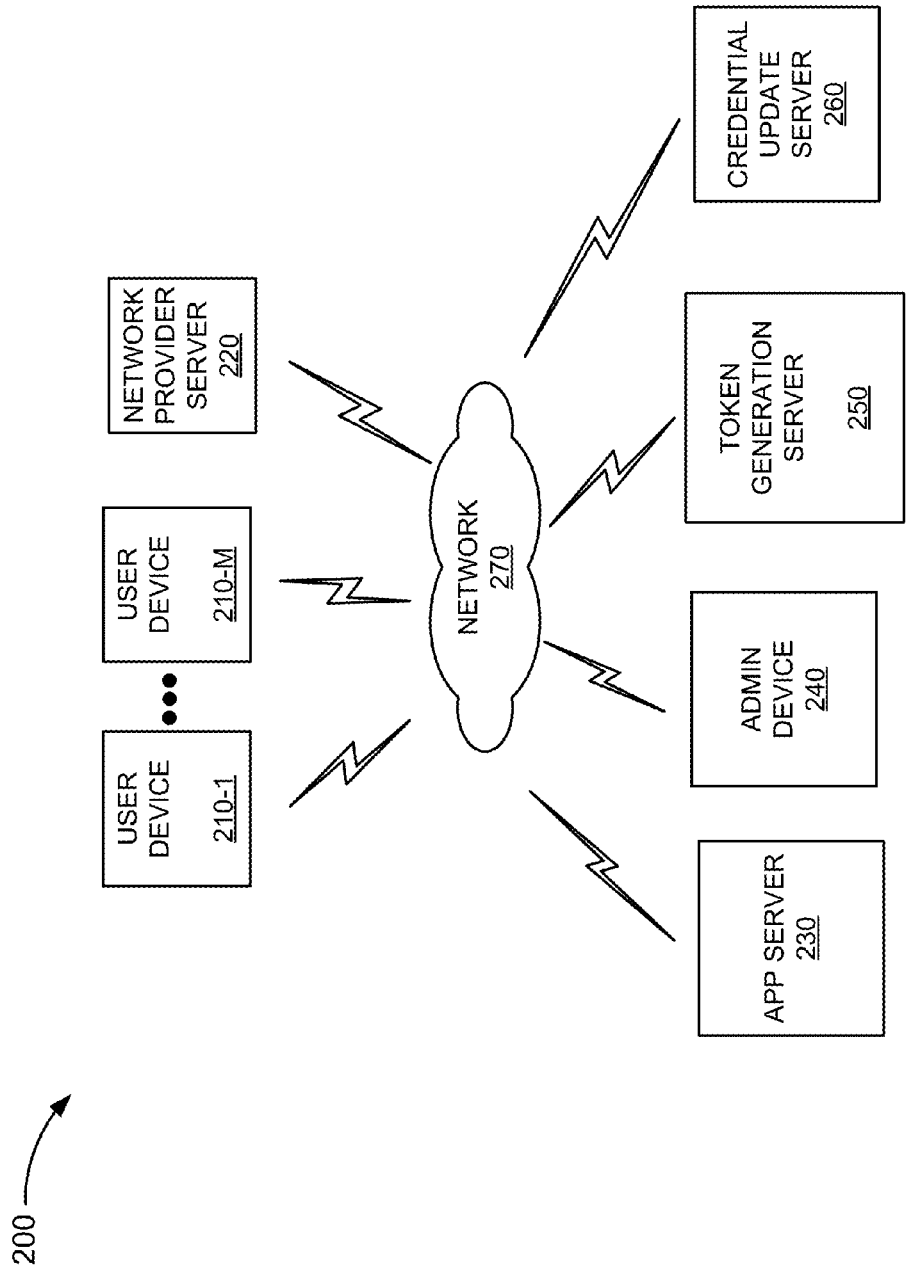
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), network provider server 220, app server 230, administrative device (referred to as "admin device") 240, token generation server 250, credential update server 260, and network 270.

User device 210 may include a device capable of communicating via a network, such as network 270. For example, user device 210 may correspond to a mobile communication device (e.g., a smart phone or a personal digital assistant (PDA)), a portable computer device (e.g., a laptop computer, a tablet computer, a wearable computer), a desktop computing device, a server device, a machine-to-machine device, or another type of device. In some implementations, user device 210 may communicate with app server 230 to receive service data corresponding to a service requested by user device 210 (e.g., a location identification service).

Network provider server 220 may include one or more devices, such as a server device, or a collection of server devices. In some implementations, network provider server 220 may store information which app server 230 may access to provide a service to user device 210 (e.g., a real-time service, such as a click-to-call server, a video chat service, a location identification service, and/or some other type of service). For example, network provider server 220 may store information associated with multiple user devices 210, such as location information, account information, billing information, network access permissions information, user device type information, or some other information regarding user devices 210. In some implementations, network provider server 220 may store credentials to allow app server 230 to access information stored by network provider server 220.

App server 230 may include one or more devices, such as a server device, or a collection of server devices. In some implementations, app server 230 may implement an application used to provide a service to user device 210 or to some other device, such as a location based coupon sender service and/or a machine-to-machine service, such as a package tracking service). As described above, the application may include credentials, embedded in the application, used to access network provider server 220 to identify information used to provide the service. Additionally, or alternatively, app server 230 may access network provider server 220 for some other purpose. In some implementations, app server 230 may communicate with token generation server 250 and/or credential update server 260 to update the credentials independently of network provider server 220 and/or without user interaction.

Admin device 240 may include a device capable of communicating via a network, such as network 270. For example, admin device may correspond to a mobile communication device (e.g., a smart phone or a personal digital assistant (PDA)), a portable computer device (e.g., a laptop computer, a tablet computer), a wearable computer, a desktop computing device, a service device, or another type of device. In some implementations, admin device 240 may be associated with app server 230 and may be used to request an update to a credential (e.g., from token generator server 250), on behalf of app server 230. In some implementations, token generator server 250 may provide a token to app server 230 based on receiving the request from admin device 240.

Token generation server 250 may include one or more devices, such as a server device, or a collection of server devices. In some implementations, token generation server 250 may provide an instruction, to app server 230, to update credentials associated with an application. In some implementations, token generation server 250 may receive a request to update the credentials (e.g., from app server 230 and/or admin device 240), and may provide a token to app server 230 which app server 230 may use to receive updated credentials from credential update server 260. Token generation server 250 may provide information regarding the token to credential update server 260 to allow credential update server 260 to generate updated credentials for app server 230.

Credential update server 260 may include one or more devices, such as a server device, or a collection of server devices. In some implementations, credential update server 260 may receive an instruction (e.g., from token generation server 250) to generate updated credentials for app server 230. For example, credential update server 260 may receive information regarding a token (e.g., information identifying a particular app server 230, information identifying particular credentials to update, and/or some other information used to generate updated credentials). Credential update server 260 may provide the updated credentials to app server 230. Additionally, or alternatively, credential update server 260 may restore a previous set of credentials in the event that the updated credentials are not compatible with app server 230. In some implementations, token generator server 250 and/or credential update server 260 may be associated with the same or with different parties.

Network 270 may include one or more wired and/or wireless networks. For example, network 270 may include a cellular network, a public land mobile network (PLMN), a second generation (2G) network, a third generation (3G) network, a fourth generation (4G) network, a fifth generation (5G) network, and/or another network. Additionally, or alternatively, network 270 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
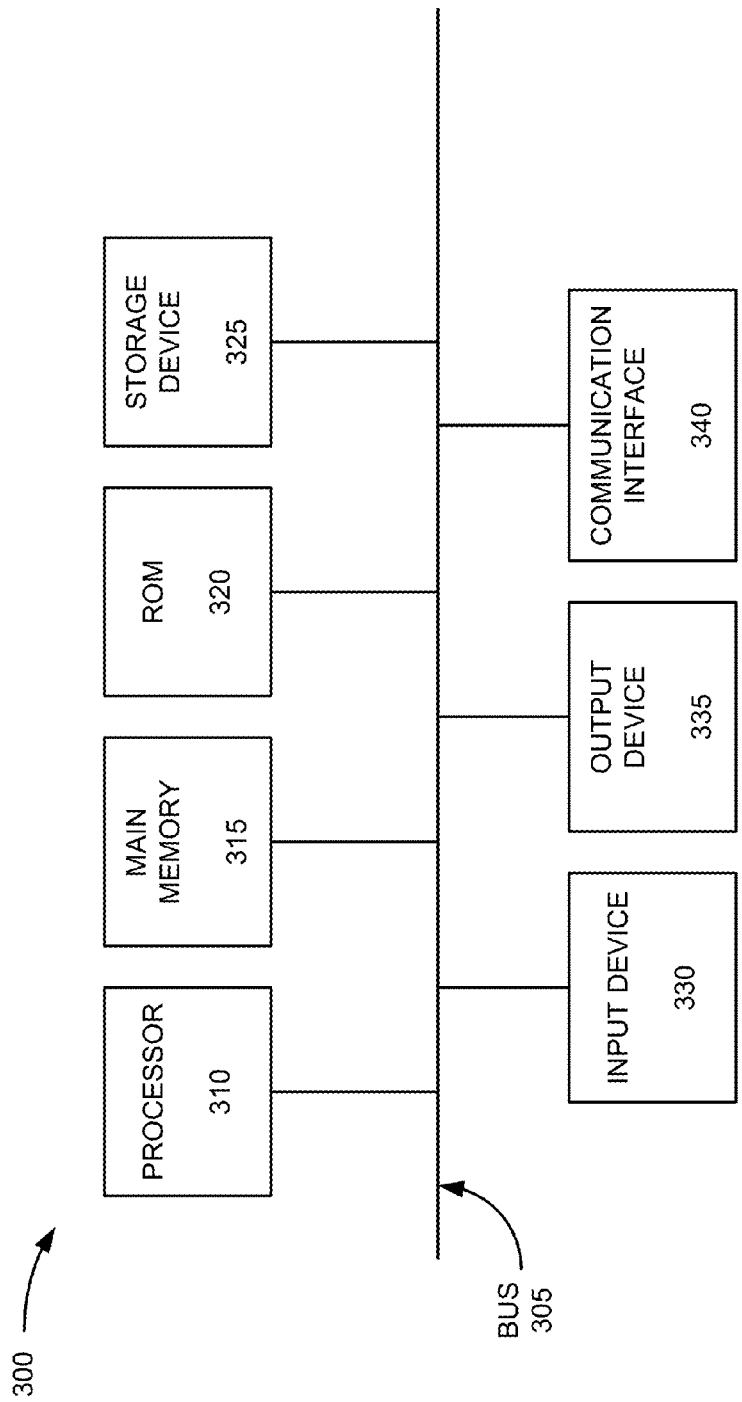
FIG. 3 illustrates example components of a device that may be used within the environment of FIG. 2.

FIG. 3 illustrates example components of a device 300 that may be used within environment 200 of FIG. 2. Device 300 may correspond to user device 210, network provider server 220, app server 230, admin device 240, token generation server 250, and/or credential update server 260. Each of user device 210, network provider server 220, app server 230, token generation server 250, and/or credential update server 260 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, a microphone, a gesture input device, or another type of input device. Output device 335 may include a component that outputs information to the operator, such as a light emitting diode (LED), a display, an audio speaker, a haptic device, or another type of output device. Communication interface 340 may include any transceiver-like mechanism that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components.

FIG. 4 illustrates an example data structure 400 that may be stored by one or more devices in environment 200. In some implementations, data structure 400 may be stored in a memory of token generation server 250. In some implementations, data structure 400 may be stored in a memory separate from, but accessible by, token generation server 250. In some implementations, data structure 400 may be stored by some other device in environment 200, such as user device 210, network provider server 220, app server 230, or credential update server 260. In some implementations, information stored by data structure 400 may be encrypted using an algorithm having a complexity based on a security protocol.

As shown in FIG. 4, data structure 400 may include authorization parameters field 410 and token parameters field 420.

Authorization parameters field 410 may include information used to authorize app server 230 to receive a token that may be used by app server 230 to receive updated credentials for a particular application implemented by app server 230 (e.g., when app server 230 requests updated credentials and/or when admin device 240 requests updated credentials on behalf of app server 230). For example, token generator server 250 may generate a token for app server 230 when authorization parameters, provided by app server 230 and/or admin device 240 as part of a request for updated credentials, match information stored by authorization parameters field 410.

In some implementations, authorization parameters field 410 may include administrative credentials field 411. Administrative credentials field 411 may include a username, a password, and/or some other information to verify a requester, associated with app server 230, and to verify whether app server 230 may receive a token used to receive updated credentials.

In some implementations, authorization parameters field 410 may also include IP address field 412. IP address field 412 may store an IP address associated with app server 230 and/or admin device 240. In some implementations, IP address field 412 may store some other type of network address, such as a media access control (MAC) address. Additionally, or alternatively, IP address field 412 may store a device identifier, associated with app server 230 and/or admin device 240, such as a unique device identifier (UDID), an International Mobile Station Equipment Identity (IMEI), an open device identification number (ODIN), or the like.

In some implementations, authorization parameters field 410 may also include location field 413. Location field 413 may store information identifying a geographic proximity (e.g., information identifying a radius and a geographic position, such as longitude/latitude coordinates or some other measure of geographic position) within which a request for a token is permitted to be made. In some implementations, location field 413 may store a geographic address, a zip code, a city, a town, a state, county, a country and/or some other information to identify a geographic position.

In some implementations, the information identifying the geographic proximity may relate to a location of app server 230. In some implementations, location field 413 may store information to identify a geographic proximity where a request for updated credentials may be made (e.g., based on a security protocol), such as a home or office location of an operator of app server 230, a data center associated with app server 230, and/or some other location.

Token parameters field 420 may include information to identify parameters associated with a token generated by token generator server 250. In some implementations, the token parameters may correspond to a set of authorization parameters. As shown in FIG. 4, token parameters field 420 may include credential update authorization field 421, update time period field 422, and regression time period field 423.

Credential update authorization field 421 may store information that identifies particular credentials that may be updated for a particular application implemented by app server 230. Examples may include username/password credentials, fingerprint credentials, face print credentials, voiceprint credentials, or some other type of credentials. Additionally, or alternatively, credential update authorization field 421 may store information to identify some other parameter, stored by app server 230 and/or an application implemented by app server 230, that may be changed, such as an entity name, an application name, an address of a company associated with app server 230, etc.

Update time period field 422 may store information that identifies a time period that app server 230 may use a token to request updated credentials from credential update server 260 to request updated credentials. For example, a token, generated by token generator server 250, may expire after the particular period of time specified by update time period field 422. In some implementations, (e.g., when the token has expired), app server 230 may no longer use the token to receive updated credentials.

In some implementations, the time period stored in update time period field 422 may correspond to a security protocol implemented by network provider server 220, token generation server 250, and/or credential update server 260. For example, the time period may prevent app server 230 from accessing credential update server 260 for an extended period of time that may expose token generation server 250 and/or credential update server 260 to a security threat.

Regression time period field 423 may store information to identify a time period in which app server 230 may request to restore a previous set of credentials. For example, app server 230 may perform a compatibility test to determine whether updated credentials, provided by credential update server 260 to app server 230, are compatible with app server 230. The time period stored by regression time period field 423 may identify a time period (e.g., a time period after app server 230 receives updated credentials) that credential update server 260 may store a previous set of credentials for restoration to app server 230 in the event the updated credentials are not compatible with app server 230.

As shown in FIG. 4, data structure 400 may store information to identify different tokens for the same requestor (e.g., as shown by identical administrative credentials in administrative credentials field 411). For example, app server 230 may be authorized to receive different updated credentials when requests for updated credentials are received by the same requester. In some implementations, the updated credentials may be based on an IP addresses from which a request for the updated credentials was sent, based on different geographic locations from which the request was sent, or based on some other authorization parameter. As an example, assume that the same requester makes a first request for updated credentials from a first geographic location and makes a second request for updated credentials from a second geographic location. Given these assumptions, app server 230 may receive a first set of updated credentials when the requester makes the first request and app server 230 may receive a different set of updated credentials when the requester makes the second request.

While particular fields are shown in a particular format in data structure 400, in practice, data structure 400 may include additional fields, fewer fields, different fields, or differently arranged fields than are shown in FIG. 4.

Figure 5:
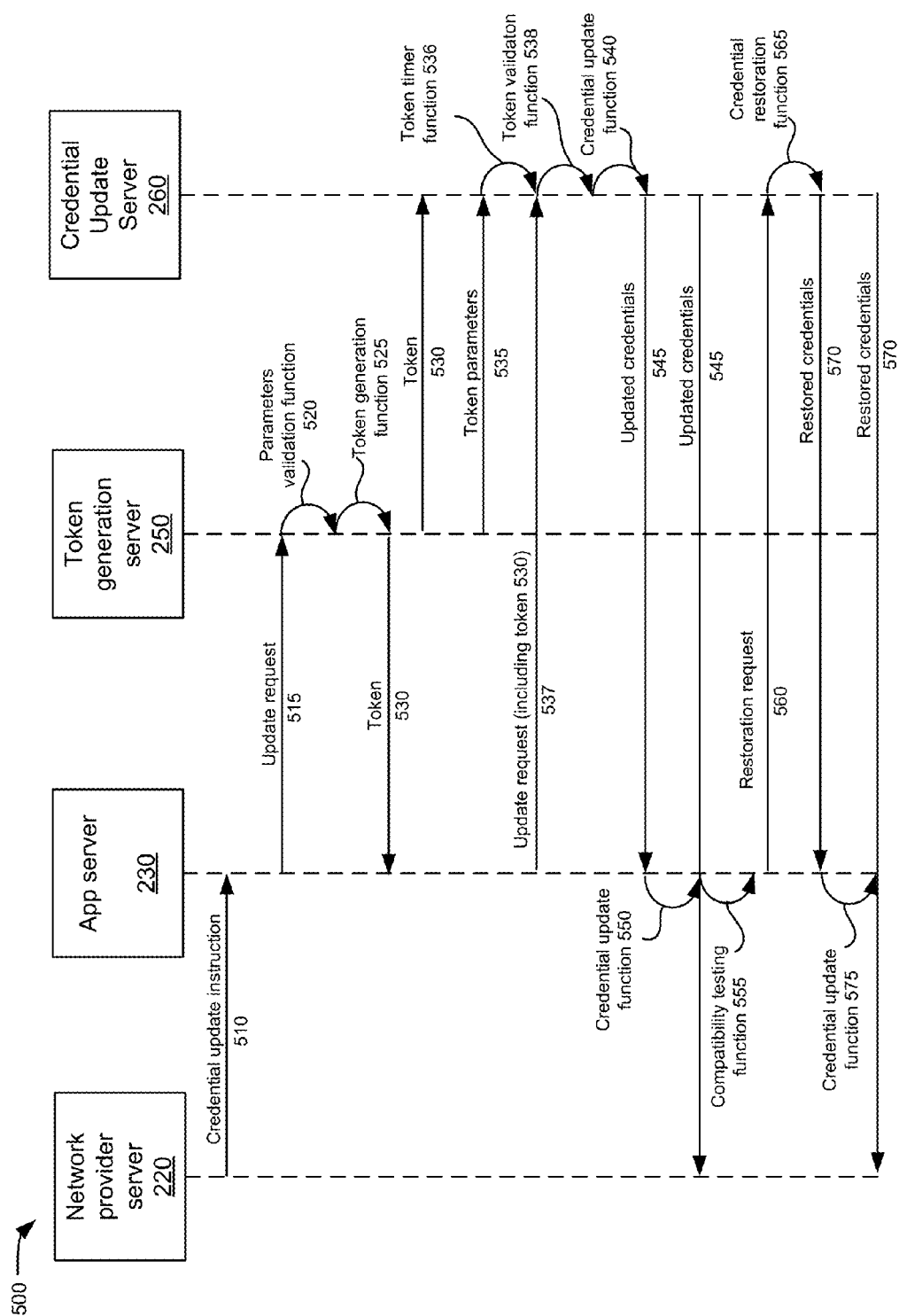
FIG. 5 illustrates a call flow diagram of example operations capable of being performed by an example portion of the environment of FIG. 2.

FIG. 5 illustrates a call flow diagram of example operations capable of being performed by an example portion 500 of environment 200. As shown in FIG. 5, portion 500 may include network provider server 220, app server 230, token generation server 250, and credential update server 260. Network provider server 220, app server 230, token generation server 250, and credential update server 260 may include components and/or perform functions described above in connection with, for example, one or more of FIGS. 1-3. FIG. 5 may correspond to example operations to update credentials embedded within an application implemented by app server 230.

As shown in FIG. 5, app server 230 may receive credential update instruction 510 from network provider server 220. For example, network provider server 220 may store information that identifies an expiration date and/or time of a credential embedded within the application. Network provider server 220 may provide credential update instruction 510 based on determining that the credential has expired or that the credential will expire within a particular time (e.g., based on the expiration date/time of the credential). In some implementations, network provider server 220 may provide credential update instruction 510 when network provider server 220 communicates with app server 230 for some other purpose (e.g., when network provider server 220 provides data to app server 230 to allow app server 230 to provide a service to user device 210).

Additionally, or alternatively, network provider server 220 may provide credential update instruction 510 based on identifying fraudulent and/or suspicious communications activity between app server 230 (or one or more other app servers 230) and network provider server 220. For example, network provider server 220 may identify fraudulent and/or suspicious communications activity when app server 230 communicates with network provider server 220 from an unknown IP address, an unauthorized geographic location, etc., or when app server 230 communicates with network provider server 220 greater than a threshold number of times over a particular time period. Additionally, or alternatively, network provider server 220 may provide credential update instruction 510 based on some other factor. In some implementations, token generator server 250 and/or credential update server 260 may provide credential update instruction 510 to app server 230.

In some implementations, credential update instruction 510 may identify an ID of app server 230, an ID of the application associated with the credentials in need of updating, and/or information identifying specific credentials to update (e.g., password credentials, biometric credentials, such as fingerprints, voiceprints, retina scans, etc.). Additionally or alternatively, credential update instruction 510 may identify a time at which app server 230 may request a credential update (e.g., based on an expiration of the credentials in need of updating and/or based on an off-peak network activity time).

In some implementations, app server 230 may provide, to token generation server 250, update request 515 in order to receive a token used to receive updated credentials. For example, app server 230 may provide update request 515 based on receiving credential update instruction 510. Additionally, or alternatively, app server 230 may provide update request 515 based on a manual instruction received by an operator of app server 230. Additionally, or alternatively, app server 230 may provide update request 515 based on determining that an expiration of the credential has expired or will expire within a particular time (e.g., based on the expiration date and/or time of the credential). Additionally, or alternatively, app server 230 may provide update request 515 based on some other factor. In some implementations, admin device 240 may provide update request 515 on behalf of app server 230.

In some implementations, update request 515 may include authorization parameters, such as administrative credentials (e.g., a user name and/or a password), an IP address of a requestor (e.g., app server 230 and/or admin device 240) that provides update request 515 to token generator server 250, information identifying a geographic location of the requestor, and/or some other information to identify and authorize app server 230 to receive a token.

As shown in FIG. 5, token generation server 250 may perform parameters validation function 520 based on receiving update request 515. In some implementations, token generation server 250 may validate the authorization parameters included in update request 515 based on information stored by data structure 400. For example, token generation server 250 may validate the authorization parameters included in update request 515 when the authorization parameters included in update request 515 matches information stored by authorization parameters field 410 of data structure 400.

As an example, token generation server 250 may compare a username and password, included in the authorization parameters of update request 515, with a username and password stored by authorization parameters field 410. In some implementations, (e.g., when the authorization parameters included in update request 515 match information stored by authorization parameters field 410), token generation server 250 may validate other authorization parameters included in update request 515 against other information stored by authorization parameters field 410.

In some implementations, token generation server 250 may perform audit logging based on receiving update request 515. For example, token generation server 250 may perform audit logging to identify when app server 230 requests updated credentials and to identify potentially fraudulent activity between app server 230 and token generation server 250 (e.g., when app server 230 requests updated credentials greater than a threshold number of times in a particular time period, when app server 230 requests updated credentials from an unauthorized IP address, etc.).

In some implementations, token generation server 250 may perform token generation function 525 based on validating the authorization parameters included in update request 515. For example, token generation server 250 may generate token 530 (e.g., based on performing token generation function 525). In some implementations, token 530 may include a predetermined quantity of characters. In some implementations, token generator server 250 may generate token 530 based on parameters relating to app server 230 or the application of app server 230 for which credentials are to be updated. For example, the token may include a hash value of a username and/or password associated with app server 230. In some implementations, token 530 may include a hexadecimal string of characters (e.g., in an extensible markup language (XML) format, or some other format). As shown in FIG. 5, token generation server 250 may provide token 530 to app server 230 and to credential update server 260.

In some implementations, token generator server 250 may not perform token generation function 525 (e.g., when token generation server 250 does not validate the authorization parameters included in update request 515). In this case, token generator server 250 may provide an indication, to app server 230, that the authorization parameters are invalid and may not generate token 530.

In some implementations, token generation server 250 may identify token parameters 535 based on the authorization parameters included in update request 515 and based on information stored by data structure 400. As shown in FIG. 5, token generation server 250 may provide token parameters 535 to credential update server 260. Token parameters 535 may include information to identify credentials that may be updated, an update time period (e.g., a time to live (TTL) associated with token 530), and/or a regression time period. Additionally, or alternatively, token parameters 535 may include a current set of credentials, stored by the application of app server 230, that may be in need of updating.

In some implementations, token parameters 535 may include network protocols, such as protocols that identify port numbers that credential update server 260 may use to communicate with app server 230 and/or token generation server 250, an IP addresses associated with app server 230 and/or token generation server 250, an ID of app server 230 that may receive a token, and/or some other metadata that credential update server 260 may use to communicate with app server 230 and/or token generation server 250. Additionally, or alternatively, token parameters 535 may include information to identify network protocols that credential update server 260 may use to communicate with app server 230 (e.g., based on a trust-level of app server 230 or based on some other factor).

In some implementations, credential update server 260 may perform token timer function 536 based on receiving token 530. As described above, a token may have an associated update time period (e.g., a TTL) that identifies a valid time period of the token. Thus, credential update server 260 may, upon receipt of token 530, set a timer that is to expire when token 530 expires. As described below in greater detail with respect to token validation function 538, credential update server 260 may validate a token based on the update time period.

As further shown in FIG. 5, app server 230 may provide token 530 to credential update server 260 (e.g., as part of a request for updated credentials, such as update request 537). In some implementations, credential update server 260 may perform token validation function 538 based on receiving token 530. For example, credential update server 260 may determine whether token 530 was received within the update time period associated with token 530. As an example, assume that token 530 was received by credential update server 260 from token generator server 250 at 12:00:00 and that token 530 includes an update time period of five minutes. Further, assume that token 530 was received by credential update server 260 from app server 230 at 12:04:00. Given these assumptions, credential update server 260 may validate token 530.

Additionally, or alternatively, credential update server 260 may determine whether the token 530 received from token generation server 230 matches the token received from app server 230. In some implementations, credential update server may validate token 530 when the token 530 received from token generation server 230 matches the token received from app server 230.

In some implementations, credential update server 260 may perform credential update function 540 to generate updated credentials 545. In one example implementation (e.g., when the credentials to update include password credentials, such as a string of characters), credential update server 260 may generate a random string of characters in any format and length using a random number generator or using some other technique. In some implementations, credential update server 230 may generate a string of characters based on a security protocol that defines the length and format of the string of characters and/or defines some other parameter with which to generate the updated credentials. In some implementations, credential update server 260 may receive updated security protocols and may generate updated credentials 545 based on the updated security protocols. As shown in FIG. 5, app server 230 may receive updated credentials 545. In some implementations, app server 230 may receive updated credentials 545 when a user of app server 230 provides authentication information to receive the credentials (e.g., via a user interface of app server 230). Alternatively, app server 230 may receive updated credentials 545 without user interaction.

In some implementations (e.g., when the credentials to update include biometric credentials, such as a fingerprint, a voiceprint, a face print, a retina scan, etc.), credential update server 260 may generate updated credentials 545 in the form of a checksum value of an image file, an audio file, a video file, a text file, or some other file, corresponding to the biometric credentials embedded within the application implemented by app server 230.

In other implementations (e.g., when the credentials to update include biometric credentials), credential update server 260 may not perform credential update function 540. In this case, credential update server 260 may provide authorization to app server 230 to update the credentials (e.g., to form updated credentials 545) via user input of app server 230. For example, assume that the credentials to update include a voiceprint. Given this assumption, credential update server 260 may provide authorization to app server 230 to form updated credentials 545 by updating the voiceprint via a microphone associated with app server 230 and via an application of app server 230 that converts received audio into a voiceprint. Further, credential update server 260 may receive the updated credentials from app server 230.

In some implementations, credential update server 260 may provide updated credentials 545 to network provider server 220 (e.g., to allow app server 230 to access network provider server 220 using the updated credentials). Additionally, or alternatively, (e.g., when app server 230 is used to form updated credentials 545), network provider server 220 may receive updated credentials 545 from app server 230.

In some implementations, credential update server 260 may store current credentials that app server 230 uses to access network provider server 220. As described in greater detail below, credential update server 260 may be used to restore the current credentials when updated credentials 545 are not compatible with the application of app server 230 and/or when app server 230 is unable to access network provider server 220 using updated credentials 545.

In some implementations, (e.g., when app server 230 receives updated credentials 545 from credential update server 260 and/or when app server 230 forms updated credentials 545), app server 230 may perform credential update function 550. For example, assume that the application of app server 230 accesses network provider server 220 using a current password embedded in the application. Further, assume that updated credentials 545 includes an updated password. Given these assumptions, app server 230 may update the current password based on the information included in update credentials 545 (e.g., by replacing the current password, in the application, with the updated password using a copy/paste function or using some other technique). As a result, the application of app server 230 may include an updated credential used to access network provider server 220. Further, the credential may be updated without user interaction and may be updated based on validated authorization parameters included in update request 515. Thus, only an authorized app server 230 may receive update credentials 545.

In some implementations, update credentials 545 may be in the form of a configuration file, a certificate file, or some other type of computer file used to authorize app server 230 to access network provider server 220. In some implementations, app server 230 may perform credential update function 550 to embed the computer file (or a portion of the computer file) in the application of app server 230 and to delete a previously embedded computer file (e.g., an outdated computer file) used to authorize app server 230 to access network provider server 220.

In some implementations, app server 230 and/or network provider server 220 may perform compatibility testing function 555 to determine whether updated credentials 545 are compatible with the application implemented by app server 230. For example, because updated credentials 545 may include a string of characters in any length and any format, a checksum value, and/or a computer file, updated credentials 545 may not be compatible with the application of app server 230. In some implementations, app server 230 may determine that updated credentials 545 are not compatible if app server 230 is unable to interpret updated credentials 545 and/or is unable to embed updated credentials 545 in the application.

As an example, assume that updated credentials 545 includes a string of 150 characters. Further assume that the application of app server 230 accepts a string of no more than 100 characters. Given these assumptions, app server 230 may determine that updated credentials 545 are not compatible with the application of app server 230. As another example, assume that updated credentials 545 include a particular type of computer file. Further assume that the application of app server 230 is unable to interpret the particular type of computer file. Given these assumptions, app server 230 may determine that updated credentials 545 are not compatible with the application of app server 230.

In some implementations, app server 230 may communicate with network provider server 220 using updated credentials 545 to determine whether app server 230 can access network provider server 220 using updated credentials 545. For example, app server 230 may determine that updated credentials 545 may be used to access network provider server 220 when app server 230 is able to receive a request for data stored by network provider server 220 using updated credentials. Conversely, app server 230 may determine that updated credentials 545 may not be used to access network provider server 220 when app server 230 is not able to receive a request for data stored by network provider server 220 using updated credentials 545.

In some implementations, (e.g., when updated credentials 545 are not compatible with app server 230 and/or when app server 230 is unable to access network provider server 220 using updated credentials 545) app server 230 may provide restoration request 560 to credential update server 260. In some implementations, credential update server 260 may perform credential restoration function 565 to validate restoration request 560 based on the regression time period and based on the timer of token timer function 536. For example, credential update server 260 may validate restoration request 560 when restoration request 560 is received within the regression time period. In some implementations (e.g., when restoration request 560 is not received within the regression time period), credential update server 260 may direct app server 230 to request a token from token generation server 250 (e.g., as described above).

In some implementations, credential restoration function 565 may identify a known, compatible set of credentials. For example, as described above, credential update server 260 may store compatible credentials, such as credentials included in token 530, and may provide restored credentials 570 based on identifying the compatible credentials. In some implementations, app server 230 may receive the restored credentials and may perform credential update function 575 to update the credentials based on restored credentials 570. Network provider server 220 may receive restored credentials 570 such that app server 230 may access network provider server 220 using restored credentials 570. As a result, app server 230 may retain the ability to communicate with network provider server 220 (e.g., to provide a service to user device 210) when credential update server 260 provides app server 230 with an incompatible set of credentials.

While a particular series of operations and/or data flows have been described above with regards to FIG. 5, the order of the operations and/or data flows may be modified in other implementations. Further, non-dependent operations may be performed in parallel. In some implementations, operations 560-575 may be omitted when updated credentials 545 are compatible with app server 230. In some implementations, app server 230, token generation server 250, and/or credential update server 260 may perform some other functions not described above. For example, app server 230, token generation server 250, and/or credential update server 260 may reset an expiration timer, corresponding to when credentials are due to expire, when app server 230 receives updated credentials 545 and/or performs credential update function 550.

Figure 6A:
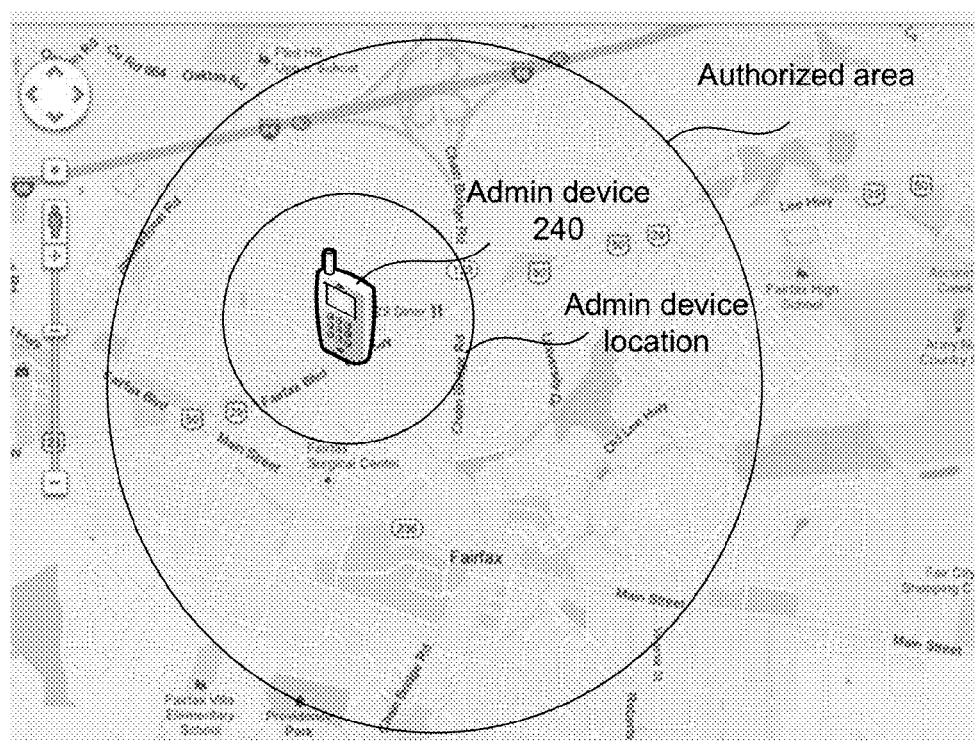
FIGS. 6A-6B illustrate example implementations, as described herein.
Figure 6B:
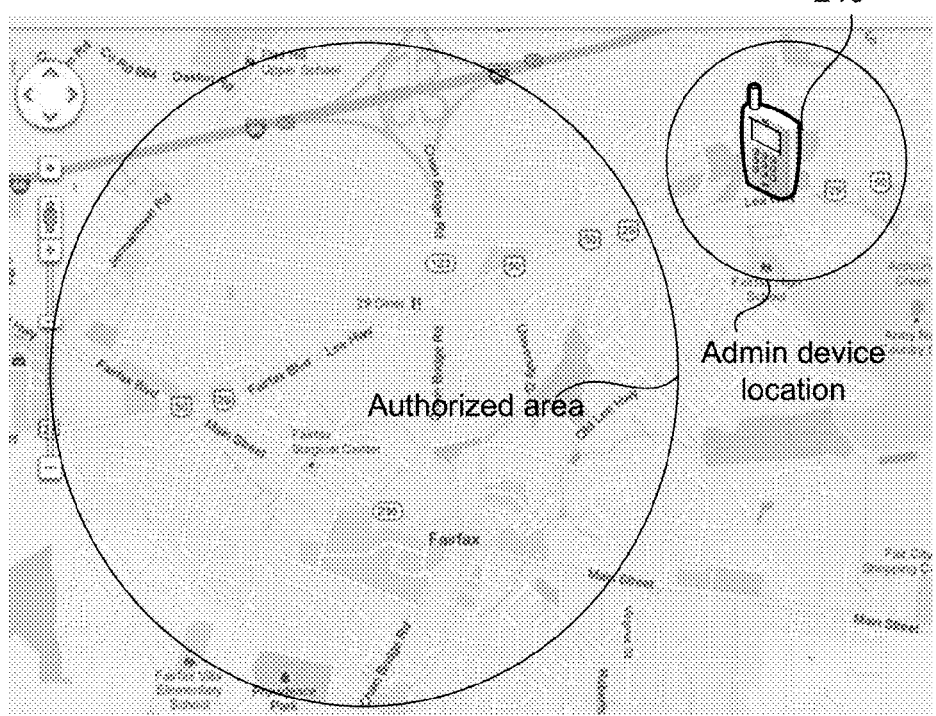

FIGS. 6A-6B illustrate example implementations as described herein. In FIGS. 6A-6B, assume that admin device 240 communicates with token generation server 250 to request to update a credential on behalf of app server 230. Further, assume that admin device 240 provides, to token generation server 250, a valid administrative credential (e.g., a username and/or a password that matches information stored by authorization parameters field 410) as part of the request to update the credential. Further, assume that token generation server 250 stores information (e.g., in authorization parameters field 410) to identify an authorized area (e.g., longitude/latitude coordinates to identify a center geographic position, and a radius) where a request for updated credentials may be made. Further, assume, as shown in FIG. 6A, that token generation server 250 determines that admin device 240 is located in a geographic location that is within the authorized area. For example, token generation server 250 may determine the geographic location of admin device 240 based on an IP address of admin device 240, by performing domain name server (DNS) queries associated with the IP address to determine the geographic location of admin device 240, by receiving geographic location information via a global positioning system (GPS) device of admin device 240, by receiving geographic location information from one or more networks to which admin device 240 is attached (e.g., mobile broadband networks), and/or using some other technique. Given these assumptions, token generation server 250 may provide a token to app server 230 which may be used to receive updated credentials, as described above.

Referring to FIG. 6B, assume now that that admin device 240 communicates with token generation server 250 to request to update a credential on behalf of app server 230. Further, assume that admin device 240 provides, to token generation server 250, a valid administrative credential as part of the request. Further, assume that token generation server 250 determines that admin device 240 is not located in a geographic location that is within the authorized area. Given these assumptions, token generation server 250 may not provide the token to app server 230 even when admin device 240 provides a valid administrative credential. In some implementations, authorization parameters field 410 may include information to identify whether app server 230 may receive a token when admin device 240 is partially in the authorized area (e.g., based on security permissions information determined by an operator of token generation server 250).

As described above, app server 230 may update credentials embedded in an application based on updated credentials received by credential update server 260. Because credentials may be updated without user interaction and without interaction with network provider server 220, the credentials may be updated at any time and may prevent service interruption as a result of outdated credentials. Further, the instruction to update credentials may be automatically triggered by network provider server 220, app server 230, admin device 240, token generation server 250, and/or credential update server 260 (e.g., based on fraud detection techniques), thereby automatically updating credentials and preventing unauthorized app servers 230 from accessing network provider server 220 when potential fraud is detected.

Further, updating the credentials may not be susceptible to user error since app server 220 may update the credentials without user interaction (e.g., using a copy and paste function to copy the updated credentials and paste the updated credentials in the code of the application implemented by the app server). As a result, the updated credentials may include a string of characters of any length, format, and/or complexity. As described above, the updated credentials may additionally, or alternatively, include a computer file, a voiceprint, a face print, a fingerprint, a retina scan, a checksum value, or some other type of credentials.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by one or more first servers, a token from a second server,
   the token received from the second server being generated by the second server based on validating an authorization parameter received from a third server,
   the third server being different from the second server, and
   the token received from the second server including a hash value of at least one of a username or a password;
   receiving, by the one or more first servers and from the second server, a token parameter associated with the token received from the second server,
   the token parameter being determined by the second server based on the authorization parameter, and
   the token parameter including information identifying an update time period or a regression time period;
   receiving, by the one or more first servers and from the third server, a request to update a credential associated with the third server;
   validating, by the one or more first servers, a token included in the request based on the token received from the second server;
   forming, by the one or more first servers, an updated credential based on the token parameter and based on validating the token included in the request,
   the updated credential being formed, by the one or more first servers, without interaction with a user of the one or more first servers; and
   providing, by the one or more first servers, the updated credential to the third server,
   the credential being replaced, by the third server, with the updated credential without interaction with a user of the third server.

2. The method of claim 1, where validating the token included in the request includes:
   determining that the token received from the second server and the token included in the request are equivalent.

3. The method of claim 1, where the credential is a password, a voiceprint, a face print, a fingerprint, a retina scan, or a computer file.

4. The method of claim 1, where the credential is a checksum value associated with a password, a voiceprint, a face print, a fingerprint, a retina scan, or a computer file.

5. The method of claim 1, where the authorization parameter is a geographic location, the password, an identifier associated with the user of the third server, or an identifier associated with the third server.

6. The method of claim 1, where the request to update the credential is provided by the third server without interaction with the user of the third server.

7. The method of claim 1, further comprising:
providing an instruction, to the third server, to update the credential,
where receiving the request to update the credential is based on providing the instruction to update the credential.

8. The method of claim 7, further comprising:
identifying fraudulent accessing of the one or more first servers;
where providing the instruction to update the credential is based on identifying the fraudulent accessing of the one or more first servers.

9. The method of claim 1, further comprising:
storing the credential based on forming the updated credential;
receiving, from the third server, a request to restore the credential after the third server replaces the credential with the updated credential; and
providing the credential to the third server based on receiving the request to restore the credential,
the updated credential being replaced with the credential by the third server.

10. A system comprising:
one or more first servers to:
receive a token from a second server,
the token received from the second server being generated by the second server based on validating an authorization parameter received from a third server,
the third server being different from the second server, and
the token received from the second server including a hash value of at least one of a username or a password;
receive, from the second server, a token parameter associated with the token received from the second server,
the token parameter being determined by the second server based on the authorization parameter, and
the token parameter including information identifying an update time period or a regression time period;
receive, from the third server, a request to update a credential associated with the third server;
validate a token, received from the third server, based on determining that the token received from the second server and the token received from the third server are equivalent;
form an updated credential based on the token parameter and based on validating the token received from the third server,
the updated credential being formed, by the one or more first servers, without interaction with a user of the one or more first servers; and
provide the updated credential to the third server,
the credential being replaced, by the third server, with the updated credential without interaction with a user of the third server.

11. The system of claim 10, where the credential is a password, a voiceprint, a fingerprint, a face print, a retina scan, or a computer file.

12. The system of claim 10, where the authorization parameter is a geographic location, the password, an identifier associated with the user of the third server, or an identifier associated with the third server.

13. The system of claim 10, where the one or more first servers are further to:
provide an instruction, to the third server, to update the credential, and
where, when receiving the request to update the credential, the one or more first servers are further to:
receive the request to update the credential further based on providing the instruction to update the credential.

14. The system of claim 13,
where the one or more first servers are further to:
identify fraudulent accessing of the one or more first servers; and
where, when providing the instruction to update the credential, the one or more first servers are further to:
provide the instruction to update the credential based on identifying the fraudulent accessing of the one or more first servers.

15. The system of claim 10, where the one or more first servers are further to:
store the credential based on forming the updated credential;
receive, from the third server, a request to restore the credential after the third server replaces the credential with the updated credential; and
provide the credential to the third server based on receiving the request to restore the credential,
the updated credential being replaced with the credential by the third server.

16. A non-transitory computer-readable medium for storing instructions, the instructions comprising:
one or more instructions which, when executed by one or more processors associated with one or more first servers, cause the one or more processors to:
receive a token from a second server,
the token received from the second server being generated by the second server based on validating an authorization parameter received from a third server,
the third server being different from the second server, and
the token received from the second server including a hash value of at least one of a username or a password;
receive, from the second server, a token parameter associated with the token,
the token parameter being determined by the second server based on the authorization parameter, and
the token parameter including information identifying an update time period or a regression time period;
receive, from the third server, a request to update a credential associated with the third server,
the request to update the credential being provided by the third server without interaction with a user of the third server;
validate a token included in the request based on the token received from the second server;
form an updated credential based on the token parameter and based on validating the token included in the request,
the updated credential being formed, by the one or more first servers, without interaction with a user of the one or more first servers; and provide the updated credential to the third server,
the credential being replaced, by the third server, with the updated credential without interaction with the user of the third server.

17. The non-transitory computer-readable medium of claim 16, where the instructions further comprise:
one or more instructions which, when executed by the one or more processors, cause the one or more processors to:
determine that the token received from the second server and the token included in the request are equivalent; and where the one or more instructions to validate the token included in the request include:
one or more instructions which, when executed by the one or more processors, cause the one or more processors to:
validate the token included in the request based on determining that the token received from the second server and the token included in the request are equivalent.

18. The non-transitory computer-readable medium of claim 16, where the credential is the password, a voiceprint, a fingerprint, a face print, a retina scan, or a computer file.

19. The non-transitory computer-readable medium of claim 16, where the instructions further comprise:
one or more instructions which, when executed by the one or more processors, cause the one or more processors to:
identify fraudulent accessing of the one or more first servers; and provide an instruction to update the credential based on identifying the fraudulent accessing of the one or more first servers.

20. The non-transitory computer-readable medium of claim 16, where the instructions further comprise:
one or more instructions which, when executed by the one or more processors, cause the one or more processors to:
store the credential based on forming the updated credential;

receive, from the third server, a request to restore the credential after the third server replaces the credential with the updated credential; and provide the credential to the third server based on receiving the request to restore the credential, the updated credential being replaced with the credential by the third server.

* * * * *